US010816405B2

(12) United States Patent
Dann

(10) Patent No.: US 10,816,405 B2
(45) Date of Patent: Oct. 27, 2020

(54) LEVEL AND SURFACE TEMPERATURE GAUGE

(71) Applicant: Rosemount Inc., Shakopee, MN (US)

(72) Inventor: Jerritt Alan Dann, Eden Prairie, MN (US)

(73) Assignee: ROSEMOUNT INC., Shakopee, MN (US)

( * ) Notice: Subject to any disclaimer, the term of this patent is extended or adjusted under 35 U.S.C. 154(b) by 284 days.

(21) Appl. No.: 16/016,093

(22) Filed: Jun. 22, 2018

(65) Prior Publication Data

US 2019/0391018 A1 Dec. 26, 2019

(51) Int. Cl.
   *G01J 5/10* (2006.01)
   *G01F 23/296* (2006.01)
   *G01J 5/00* (2006.01)

(52) U.S. Cl.
   CPC ............ *G01J 5/10* (2013.01); *G01F 23/2962* (2013.01); *G01J 2005/0081* (2013.01); *G01J 2005/106* (2013.01)

(58) Field of Classification Search
   CPC ................. G01J 5/10; G01J 2005/0081; G01J 2005/106; G01F 23/2962
   See application file for complete search history.

(56) References Cited

U.S. PATENT DOCUMENTS

| 3,544,710 A | 12/1970 | Poos |
| 4,322,627 A | 3/1982 | Pirlet |
| 4,339,664 A | 7/1982 | Wiklund et al. |
| 5,004,913 A * | 4/1991 | Kleinerman ............ G01J 5/08 250/227.21 |
| 5,337,289 A | 8/1994 | Fasching et al. |
| 6,615,657 B2 * | 9/2003 | Hongerholt ......... G01F 23/2962 73/290 R |
| 8,497,799 B2 | 7/2013 | Kleman |
| 8,686,895 B2 | 4/2014 | Nyberg |
| 8,872,694 B2 | 10/2014 | Edvardsson et al. |

(Continued)

FOREIGN PATENT DOCUMENTS

| CN | 102686988 | 9/2012 |
| CN | 106537126 | 3/2017 |

(Continued)

OTHER PUBLICATIONS

Notification of Transmittal of the International Search Report and the Written Opinion of the International Searching Authority from International Application No. PCT/US2019/035372, dated Sep. 13, 2019.

(Continued)

*Primary Examiner* — Nathaniel T Woodward
*Assistant Examiner* — Philip L Cotey
(74) *Attorney, Agent, or Firm* — Westman, Champlin & Koehler, P.A.

(57) ABSTRACT

A level and surface temperature gauge includes a housing structure, a level scanner, and a temperature scanner). The level scanner is supported by the housing structure and is configured to generate surface level measurements of a process material surface at a plurality of locations on the surface. The temperature scanner is supported by the housing structure and is configured to generate temperature measurements of the process material surface at a plurality of locations on the surface.

21 Claims, 6 Drawing Sheets

(56) References Cited

U.S. PATENT DOCUMENTS

| | | | |
|---|---|---|---|
| 9,024,807 B2* | 5/2015 | Widahl | G01S 13/88 |
| | | | 342/124 |
| 9,169,032 B2* | 10/2015 | Gengerke | G01F 23/2921 |
| 9,228,877 B2 | 1/2016 | Edvardsson | |
| 9,423,287 B2 | 8/2016 | D'Angelico et al. | |
| 9,513,153 B2 | 12/2016 | Jirskog et al. | |
| 9,746,366 B2 | 8/2017 | Nilsson et al. | |
| 10,255,991 B2 | 4/2019 | White et al. | |
| 10,260,928 B2* | 4/2019 | Welle | G01S 13/42 |
| 2004/0031335 A1* | 2/2004 | Fromme | G01B 11/24 |
| | | | 73/865 |
| 2007/0209434 A1* | 9/2007 | Peters | G01F 25/0061 |
| | | | 73/290 V |
| 2009/0093983 A1* | 4/2009 | Trafford | G01F 23/2962 |
| | | | 702/100 |
| 2013/0269832 A1* | 10/2013 | Gengerke | B65B 1/48 |
| | | | 141/95 |
| 2014/0085131 A1* | 3/2014 | Widahl | G01F 25/0061 |
| | | | 342/124 |
| 2015/0103630 A1 | 4/2015 | Bartov et al. | |
| 2015/0259084 A1* | 9/2015 | Gengerke | G01F 23/2921 |
| | | | 340/870.02 |
| 2016/0138956 A1 | 5/2016 | Griessbaum | |
| 2016/0153821 A1 | 6/2016 | Nilsson et al. | |
| 2018/0328777 A1* | 11/2018 | Gurumohan | G01S 15/102 |

FOREIGN PATENT DOCUMENTS

| | | |
|---|---|---|
| EP | 2 045 586 | 4/2009 |
| EP | 1 946 051 | 7/2017 |

OTHER PUBLICATIONS

Technical Note, 00840-0700-4570, Rev AA, "Rosemount® 5708 3D Solids Scanners for Bulk Solids Inventory and Financial Reporting", Aug. 2015, 6 pgs.

Technical Note, 00840-0600-4530, Rev AC, "Measuring Level and Volume of Solid Materials", Jul. 2016, 16 pgs.

Office Action from Chinese Patent Application No. 201811144676. 2, dated Jun. 16, 2020.

* cited by examiner

LEVEL AND SURFACE TEMPERATURE GAUGE

BACKGROUND

Embodiments of the present disclosure relate to the process and material handling/storage industries. More specifically, embodiments of the present disclosure relate to a level and surface temperature gauge for industrial or commercial systems.

Industrial or commercial systems often utilize solid material handling components that feed solid materials (e.g., grains, powders, etc.) from storage vessels, such as silos and hoppers. Such systems rely upon information relating to the level or volume of the stored material that is determined using a level gauge system.

Most level gauge systems for measuring level and/or volume of solid materials in industrial process control systems, such as guided wave radar, non-contacting radar, and acoustic phased-array technologies, utilize top down measurements. These devices determine the level or volume of the material in the vessel based on the time it takes for a signal transmitted from the device reflect off the surface of the material and return to the device.

Guided wave radar level gauges, such as that described in U.S. Pat. No. 9,228,877 utilize a waveguide or probe for conducting a transmitted signal (e.g., microwave signal) to the surface of the material, and receiving a reflected signal from the surface. Guided wave radar is capable of handling uneven material surfaces since the transmitted signal is very compact due to its guidance by the probe.

Non-contacting radar level gauge systems, such as that described in U.S. Pat. No. 9,746,366, transmit high-frequency electromagnetic radiation signals toward the material surface from an antenna, and determine the material level based on received echo signals. Non-contacting radar is affected by uneven surfaces since much of the signal is not reflected directly back and instead may be re-directed away from the device. An average level of the material surface is determined by gathering several echoes from a concentrated area, and then merging them into a single echo that represents an average of the measured area.

Acoustic phased-array level gauges, such as that described in U.S. Pat. No. 5,337,289, utilize arrays of transmitters and receivers to "scan" the material surface being monitored and to provide level measurements over an area of the material surface. The transmitters direct ultrasonic energy signals to the material surface, and the receivers receive echoes of the ultrasonic energy signals from the material surface. Such acoustic phased-array gauges are capable of taking level or volume measurements of stored materials having an uneven material surface, from which an average level or volume may be calculated.

One exemplary acoustic phased-array level gauge is the Rosemount™ 5708 Solids Scanner. This device utilizes an array of three acoustic antennas, each of which includes an array of transmitters and receivers that generate low frequency acoustic signals and receive multiple echo signals from the surface of the material contained in the storage vessel. A built-in Digital Signal Processor (DSP) digitally samples and analyzes the echoed signals and produces accurate measurements of the level and volume of the stored material. These measurements are used to generate a 3D representation of the position and form of the material surface within the container for displaying on remote computer screens.

In bulk solid material storage applications, it is important that proper environmental conditions are maintained to prevent conditions that can adversely affect the quality of the product. Sources of risk include excessive temperature, moisture, and insects. Aeration and other environmental control systems are utilized to control the conditions to maintain appropriate levels of moisture and temperature to avoid molds, spoilage, and insect infestations.

Adverse environmental conditions are often detectable on the surface of the stored material based on the temperature of the material surface. For example, condensation may form on cool surfaces of the bulk goods within the storage vessel. If condensation progresses it can lead to unacceptable levels of moisture in the product resulting in spoilage and loss. Herbivorous insects often congregate on/near the material surface and create hot spots on the material surface.

Environmental control systems may utilize temperature measurement devices to detect adverse environmental conditions, such as temperature cables or probes. However, such temperature probes are subject to strain from the bulk goods and can deteriorate over time, which may lead to costly maintenance. Additionally, temperature probes provide point temperature measurements and cannot detect temperature concerns between the probes. Thus, the use of such temperature probes may fail to provide an accurate surface temperature measurement, which may result in undetected adverse environmental conditions.

SUMMARY

Embodiments of the present disclosure are directed to a level and surface temperature gauge, such as for an industrial or commercial system, and methods of using the gauge. In some embodiments, the level and surface temperature gauge includes a housing structure, a level scanner, and a temperature scanner. The level scanner is supported by the housing structure and is configured to generate surface level measurements of a process material surface at a plurality of locations on the surface. The temperature scanner is supported by the housing structure and is configured to generate temperature measurements of the process material surface at a plurality of locations on the surface.

In one embodiment of the method, a level and surface temperature gauge is installed on a process vessel containing a process material. The gauge includes a housing structure attached to the process vessel, a level scanner supported by the housing structure, and a temperature scanner supported by the housing structure. Surface level measurements of a surface of the process material are generated at a plurality of locations on the surface using the level scanner. Temperature measurements of the surface at a plurality of locations on the surface are generated using the temperature scanner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
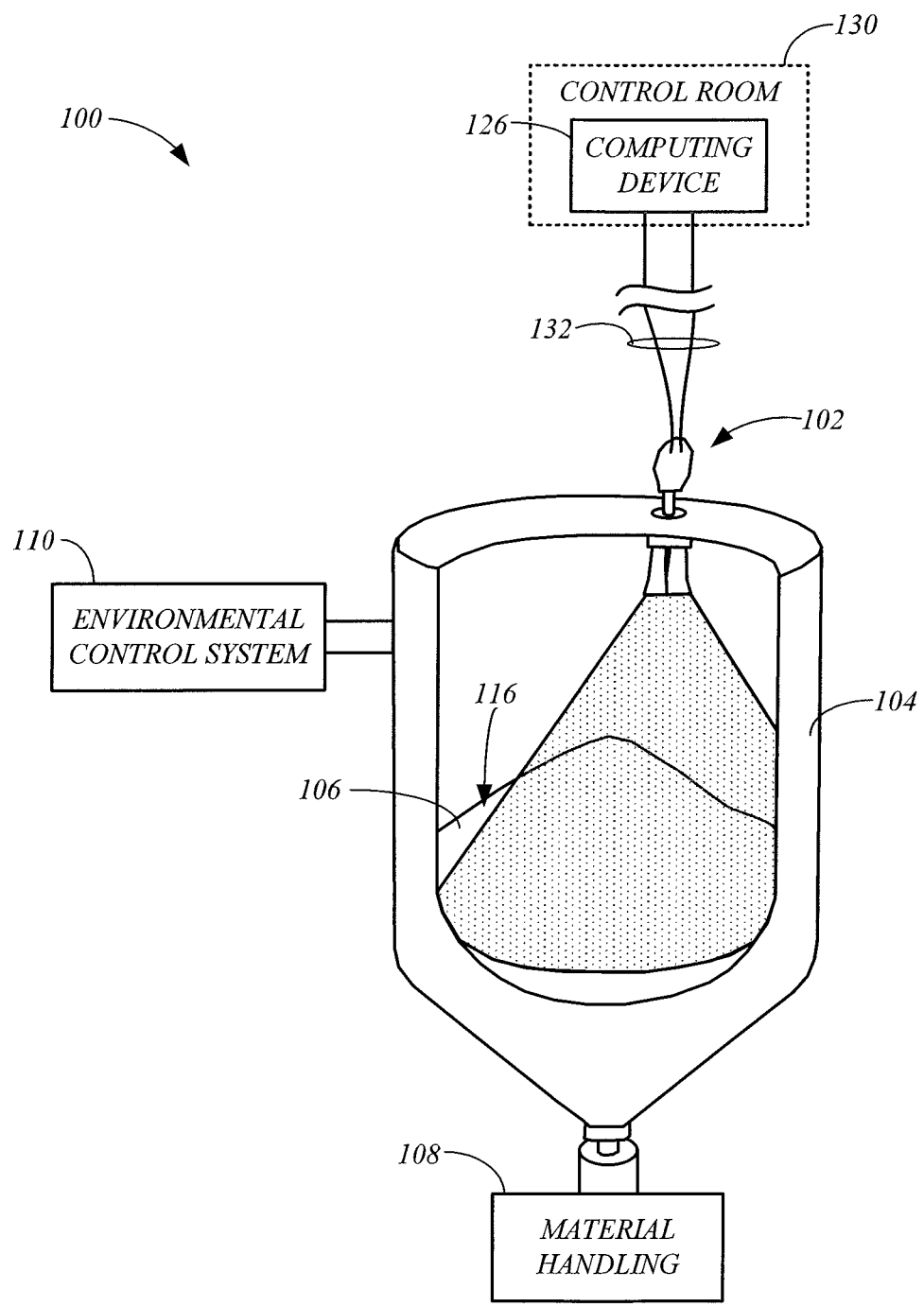
FIG. 1 is a simplified diagram of an exemplary process control system in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 illustrates an exemplary process control system 100 that includes a level and temperature gauge 102 in accordance with embodiments of the present disclosure. The gauge 102 may, for example, be installed on a process vessel 104, which is illustrated in FIG. 1 with a portion cut out to reveal the vessel interior. The vessel 104 may take on any suitable form, such as a tank, bin, or hopper. A solid process material 106, such as a granular or powdered material, for example, is contained in the vessel 104. The vessel 104 may store the material 106 for material handling components 108 (e.g., augers, conveyors, spreaders etc.), which may feed to the material 106 to material processing components for processing. An environmental control system 110 (aerators, heaters, coolers, etc.) may be used to control the environmental conditions within the vessel 104, such as the temperature and humidity, for example.

Figure 2:
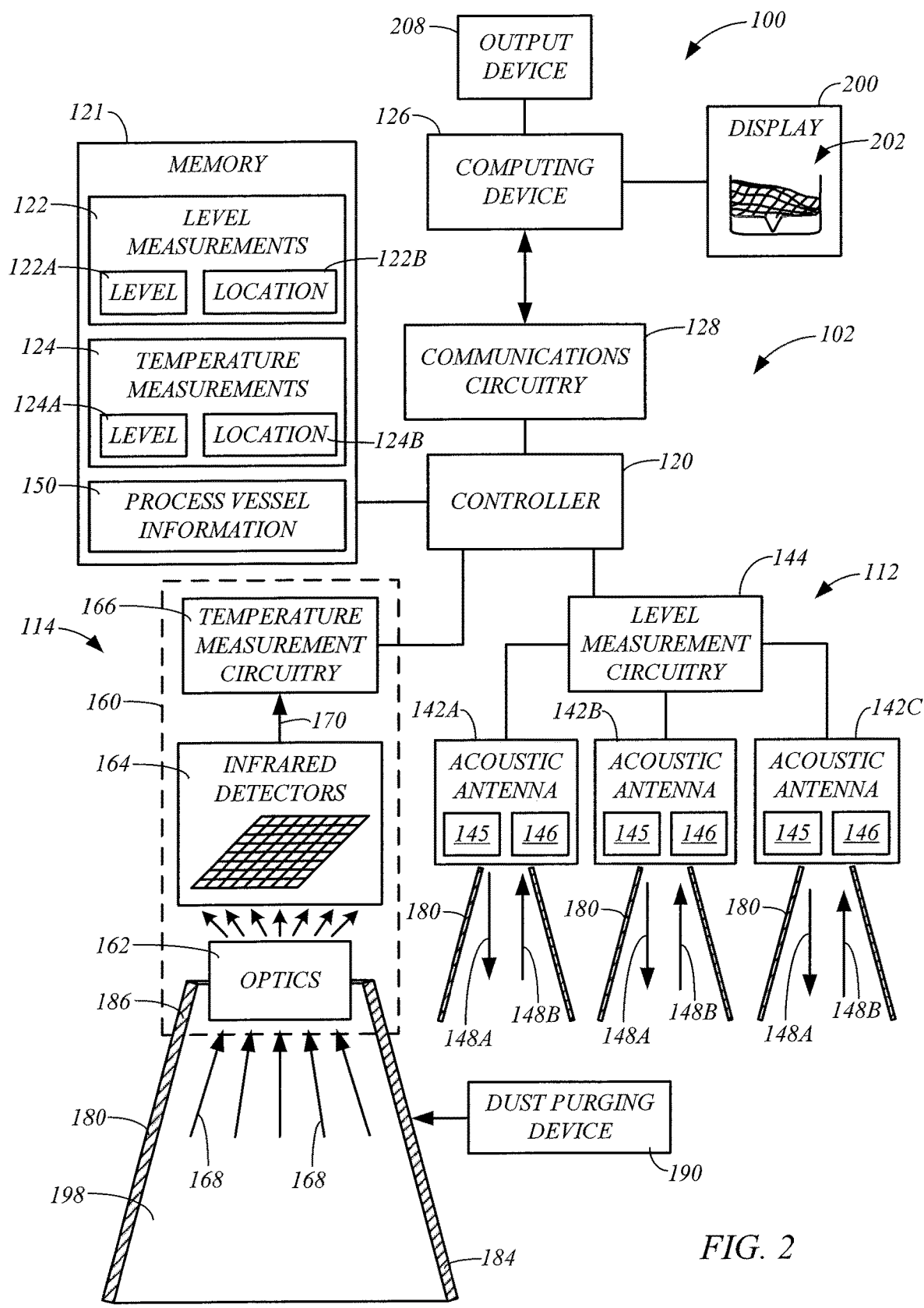
FIG. 2 is a simplified block diagram of an exemplary process control system in accordance with embodiments of the present disclosure.

FIG. 2 is a simplified block diagram of the system 100 in accordance with embodiments of the present disclosure. The level and temperature gauge 102 includes a level scanner 112 and a temperature scanner 114. The level scanner is configured to generate surface level or volume information or measurements (hereinafter "level measurements") relating to the level surface 116 of the material 106 at a plurality of locations over the surface 116, which may indicate or be used to determine a level or volume of the material 106 within the vessel 104. The temperature scanner 114 is configured to generate temperature information or measurements (hereinafter "temperature measurements") of the process material surface 116 at a plurality of locations on the surface 116.

The gauge 102 includes a controller 120 that may represent one or more processors (i.e., microprocessor, central processing unit, etc.) that control components of the gauge 102 to perform one or more functions described herein. These functions may be performed in response to the execution of program instructions, which may be stored locally in non-transitory computer readable media or memory 121 of the gauge 102, or other location. The memory 121 may also store level measurements 122 from the level scanner 112 and temperature measurements 124 from the temperature scanner 114, as indicated in FIG. 2.

In some embodiments, the controller 120 may communicate the surface level and temperature measurements to a computing device 126 (e.g., computer, laptop, mobile device, etc.) using suitable communications circuitry 128. Thus, the computing device 126 represents one or more processors for performing functions described herein in response to the execution of program instructions, which may be stored in memory (i.e., non-transitory computer readable media) of the computing device 126, or another location. The computing device 126 may be located remotely from the gauge 102, such as in a control room 130, as shown in FIG. 1.

The communications circuitry 128 may communicate (i.e., send and receive data) with the computing device 126 using any suitable technique including analog and/or digital communication protocols over wired and/or wireless communication links. In some embodiments, the communications circuitry communicates the level measurements 122, the temperature measurements 124, and/or other data to the computing device 126 over a two-wire control loop 132 (FIG. 1). In some embodiments, the control loop 132 includes a 4-20 milliamp process control loop, in which the level and/or temperature information may be represented by a level of a loop current flowing through the control loop 132, for example. Additionally, the gauge 102 may be powered by the current flowing through the control loop 132. The communications circuitry 128 may also communicate data using a suitable digital communication protocol, such as by modulating digital signals onto the analog current level of the two-wire control loop 132 in accordance with the HART® communication standard or another digital communication protocol. Other purely digital techniques may also be employed including FieldBus and Profibus communication protocols, as well as wireless protocols, such as IEC 62591.

Figure 3:
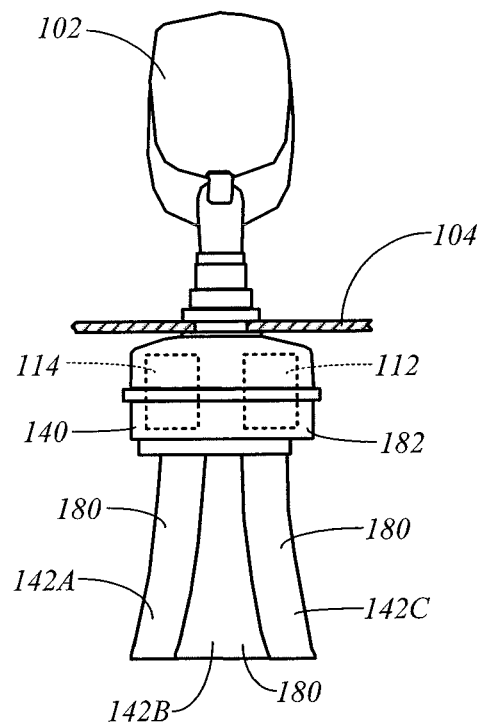
FIG. 3 is a side view of an exemplary level and temperature gauge mounted to a process vessel, a portion of which is illustrated in cross-section, in accordance with embodiments of the present disclosure.

FIG. 3 is a side view of an exemplary level and temperature gauge 102 mounted to a process vessel 104, a portion of which is illustrated in cross-section, in accordance with embodiments of the present disclosure. In some embodiments, the gauge 102 includes a housing structure 140 that supports the level scanner 112 and the temperature scanner 114, as shown in FIG. 3.

The level scanner 112 is configured to generate the surface level measurements 122 at a plurality of locations on the surface 116. In some embodiments, the level scanner 112 includes a conventional phase-array level gauge system, such as the system implemented in the Rosemount™ 5708 Solids Scanner discussed above or other suitable phase-array level gauge system. Accordingly, some embodiments of the level scanner 112 include a plurality of acoustic antennas 142, such as acoustic antennas 142A, 142B and 142C, and level measurement circuitry 144 that is configured to perform level measurements using the acoustic antennas 142 to generate the level measurements 122, as shown in FIG. 2. Each of the acoustic antennas 142 includes a conventional array of transmitters 145 and receivers 146 for implementing an acoustic phase-array level measurement. In general, the transmitters 145 are each configured to transmit acoustic signals 148A toward a location on the material surface 116. The acoustic signals 148A are reflected from the surface 116 as echo signals 148B, which are detected by the receivers 146. The level measurement circuitry determines a distance to the various locations over the surface 116 based on the elapsed time from the transmission of the acoustic signals 148A by the transmitters 145 to the reception of the corresponding echo signals 148B by the receivers 146. The level measurements 122 may be communicated to the controller 120 and stored in the memory 121 as level measurements 122. Additionally, the level measurements 122 may be communicated to the remote computing device 122 using the communications circuitry 128.

In some embodiments, the level measurements 122 generated by the level scanner 112 each include a level 122A (e.g., a distance) and a location 122B on the surface 116 corresponding to the level, as indicated in FIG. 2. The level 122A may indicate a distance from the gauge 102 to the surface 116. Alternatively, the level 122A may indicate a distance from the surface 116 to a bottom of the vessel 104, based on predefined dimensions of the vessel 104. The location 122B may comprise any suitable indication of a location on the surface 116, such as coordinates, for example. Alternatively, the location 122B may be determined based on a mapping of the receivers 146 to a location on the surface 116.

The level measurements may be processed by the level measurement circuitry 144, the controller 120, or the computing device 126 to generate a volume level of the process material 106 in the vessel 104 in accordance with conventional techniques. This calculation requires information regarding the dimensions of the process vessel 104, which may be stored in the memory 121 as process vessel information 150, as indicated in FIG. 2. Alternatively, this process vessel information may be stored in memory of the computing device 126.

The temperature scanner 114 may take on any suitable form while providing the desired temperature measurements at a plurality of locations on the process material surface 116. In some embodiments, the temperature scanner 114 includes a thermographic imaging device 160, as shown in FIG. 2. The device 160 may include optics 162, an array of infrared detectors 164, and temperature measurement circuitry 166. The optics 162 may include lenses, mirrors and/or other optical devices to optically process infrared light (arrows 168) from the material surface 116 to direct portions of the infrared light 168 to individual infrared detectors of the array 164. The infrared detectors 164 each generate infrared level signals (arrow 170) corresponding to the received infrared light 168. The temperature measurement circuitry 166 generates the temperature measurements 124 based on the infrared level signals 170.

In some embodiments, each of these temperature measurements 124 includes a temperature 124A and a location 124B, which may be stored in the memory 121, as indicated in FIG. 2. The temperature 124A indicates a measured temperature based on the received infrared light by one or more of the receivers 146. The location 124B indicates a location on the surface 116 corresponding to the measured temperature. The location 124B may comprise any suitable indication of a location on the surface 116, such as coordinates, for example. Alternatively, the location 124B may be determined based on a mapping of the infrared detectors 164 to a location on the surface 116.

In some embodiments, components of the level scanner 112 and the temperature scanner 114 are protected from the environment within the interior of the vessel 104 by surrounds 180 that extend from a base 182 of the housing 140, as shown in FIG. 3. The surrounds 180 may also isolate the components of the scanners 112 and 114 from each other and focus the components on a desired portion of the material surface 116. In some embodiments, the surrounds 180 have an open distal end 184, and components of the level scanner 112 and the temperature scanner 114 are located adjacent a proximal end 186 of the surround 180. For example, the optics 162 of the thermal graphic imaging device 160 may be positioned adjacent the proximal end 186 of the surround 180, as shown in FIG. 2. In some embodiments, each of the surround 180 is conically shaped and tapers towards proximal end 186. The open distal end 184 allows infrared light 168 to reach the optics 162 of the thermal graphic imaging device 160, and allows for the transmission of the acoustic signals 148A from each of the acoustic antennas 142 to the process material surface 116, and the reception of acoustic echo signals 148B from the surface 116 to the acoustic antenna 142.

Figures 4, 5:
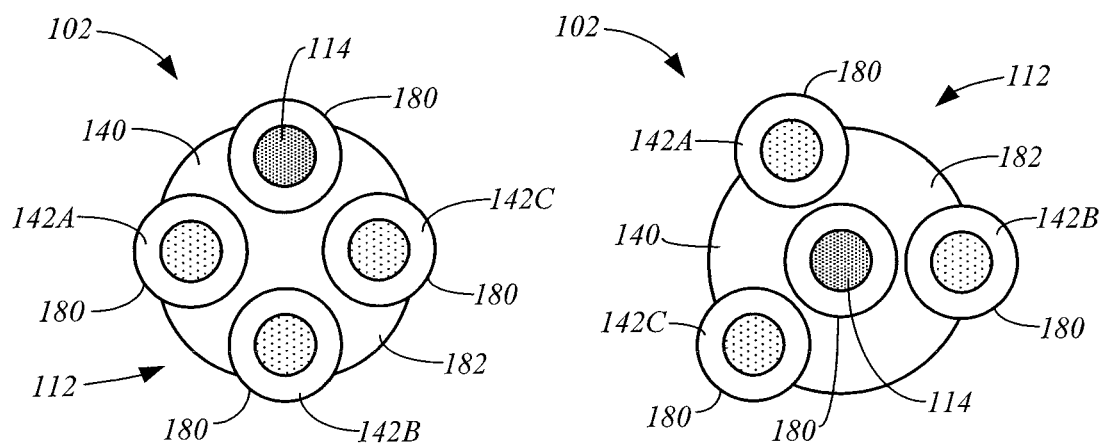
FIGS. 4 and 5 are bottom views of exemplary level and surface temperature gauges in accordance with embodiments of the present disclosure.

The surrounds 180 and the corresponding acoustic antenna 142 and the temperature scanner 114 may be arranged in different configurations. FIGS. 4 and 5 are bottom views of the level and surface temperature gauge 102 illustrating exemplary configurations in accordance with embodiments of the present disclosure. In one embodiment, each of the surrounds 180 corresponding to the acoustic antennas 142A-C and the surround 180 corresponding to the temperature scanner 114 may be angularly displaced from each other on the base 182 as shown in FIG. 4. In accordance with another exemplary embodiment, the surround 180 corresponding to the temperature scanner 114 is centrally located on the base 182, while the surrounds 180 corresponding to the acoustic antennas 142A-C are angularly displaced from each other around the temperature scanner 114, as shown in FIG. 5. Other arrangements for the acoustic antennas 142A-C and the temperature scanner 114 may also be used.

Over time, dust and debris may cling to the surround 180, which could impede surface level and temperature measurements by the scanners 112 and 114. Some embodiments of the level and temperature gauge 102 include one or more dust purging devices 190 (FIG. 2), each of which is configured to purge dust from a corresponding surround 180 to enable a clear pathway for conducting the temperature and level measurements. While only a dust purging device 190 for the surround 180 of the temperature scanner 114 is shown in FIG. 2 to simplify the drawing, it is understood that embodiments of the dust purging device 190 may also be used with the surrounds 180 of the level scanner 112.

Figure 6:
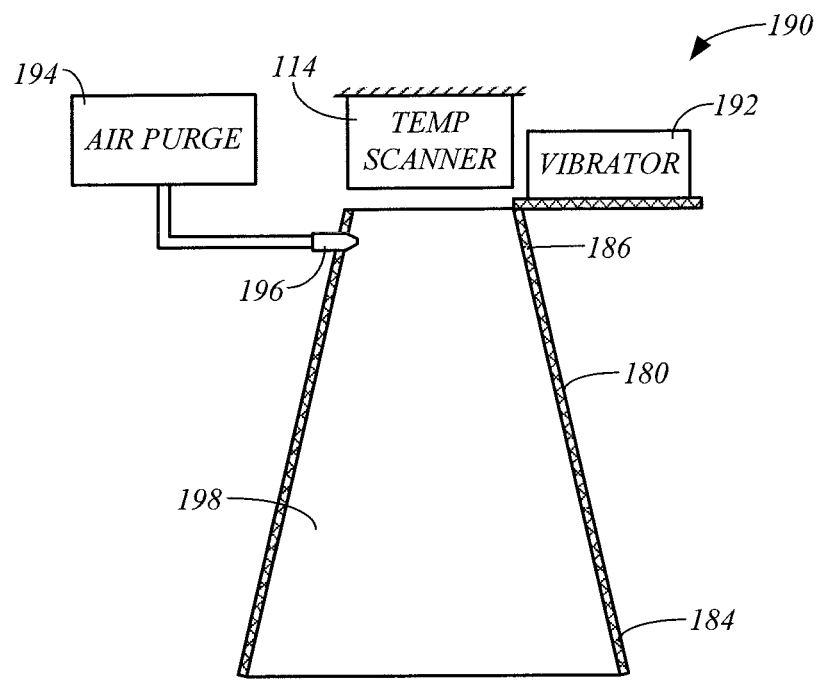
FIG. 6 is a simplified side cross-sectional view of a surround for a temperature scanner and exemplary dust purging devices in accordance with embodiments of the present disclosure.

FIG. 6 is a simplified side cross-sectional view of a surround 180 for the temperature scanner 114 and exemplary dust purging devices 190 in accordance with embodiments of the present disclosure. Some embodiments of the dust purging device 190 include a vibrator 192 that is attached to the surround 180, as shown in FIG. 6. The vibrator 192 may include a vibrating device, such as a mass that is rotatably driven by a motor about an axis that is displaced from a center of gravity of the mass, for example, or another suitable vibrating device. The vibrations generated by the vibrator 192, vibrate the surround 180 and shake off dust and debris clinging to the surround 180. In some embodiments, components of the temperature scanner 114 are isolated from the vibrations induced by the vibrator 192. This may be accomplished by not directly attaching the components to the surround 180, as illustrated in FIG. 6, or by including conventional vibration isolating structures between the components of the level scanner 112 and the surround 180.

In some embodiments, the dust purging device 190 includes an air purge system 194 having a nozzle 196 that is configured to direct a flow of air into an interior 198 of the surround 180, as shown in FIG. 6. The air purge system 194 may include a source of compressed air which is delivered to the interior 198 of the surround 180 through the nozzle 196 to blow dust and debris from the walls of the surround 180.

Figure 7:
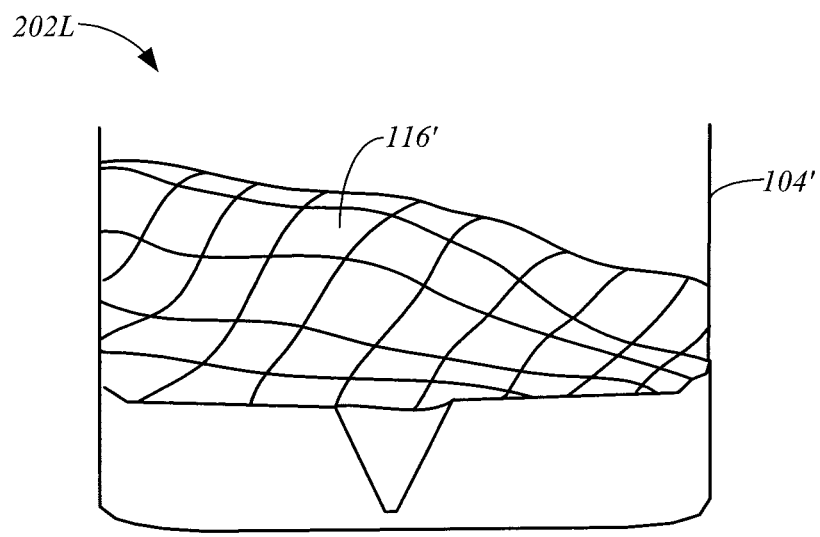
FIG. 7 is an exemplary 3D graphical representation of level measurements in accordance with embodiments of the present disclosure.

In some embodiments, the computing device 126 is configured to display at least one graphical representation 202 of the level measurements 122 and the temperature measurements 124 on a display 200 (FIG. 2). The display 200 may be any conventional display including a display that is integral to the computing device 126 or a separate display unit. The graphical representation 202 of the level measurements may include two-dimensional (2D) and/or three-dimensional (3D) graphical representations of the level of the process material 106 contained in the process vessel 104. For example, a 2D graphical representation of the measured levels may include an average level of the process material 106 in the vessel, a profile of the actual measured levels at different locations along the process material surface 116, or another suitable graphical representation. FIG. 7 illustrates an exemplary 3D graphical representation 202L of the level measurements 122 that are based on the level 122A and location 122B information provided by the level measurements 122. The graphical representation 202L of the level measurements 122 may include a virtual vessel 104' representing the actual vessel 104, and a virtual surface 116' representing the actual surface 116 of the material 106 contained in the vessel 104. A contour of the virtual surface 116' represents the measured levels 124A at their corresponding locations 124B on the surface 116. Such 3D graphical representations of the level measurements may be generated in the same or similar manner as those generated by systems using the Rosemount™ 5708 Solids Scanner in combination with the Emerson 3D vision/3D multivision application software.

Figure 8:
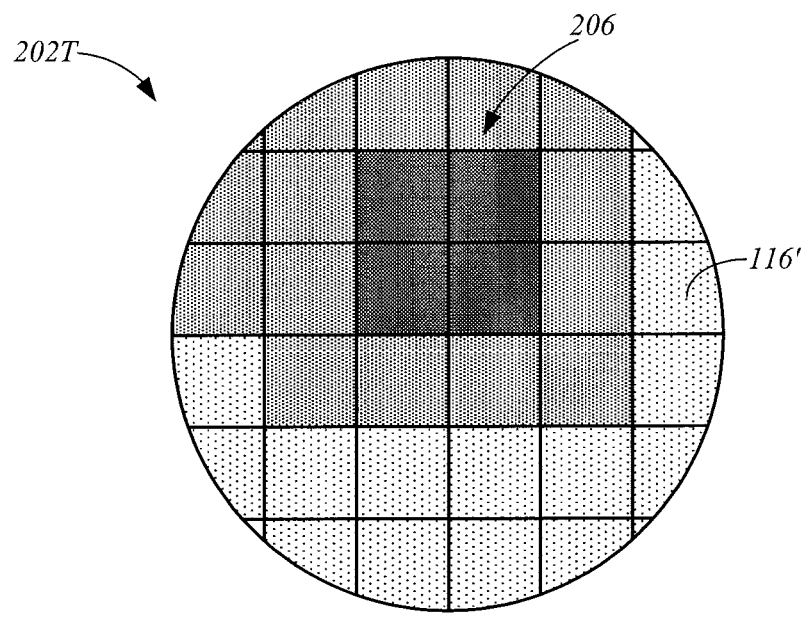
FIG. 8 is an exemplary 2D graphical representation of temperature measurements in accordance with embodiments of the present disclosure.

In some embodiments, the computing device 126 may produce a 2D graphical representation 202T of the temperature measurements 124, as shown in FIG. 8, on the display 200 that conveys the temperature 124A and location 124B information provided by the temperature measurements 124. Different temperatures may be indicated by different colors, shading, or another suitable graphical representation. For example, each of the boxes in the 2D graphical representation 202T of the temperature measurements 124 may indicate a separate temperature measurement by one of the infrared detectors 164, or an average of a group of temperature measurements by a group of infrared detectors 164. The lighter shaded boxes may represent lower temperatures, and the darker shaded boxes may represent higher temperatures. Thus, the exemplary 2D graphical representation 202T of the temperature measurements 124 shown in FIG. 8 may be used to indicate a hot or cold spot in region 206, which could respectively indicate an insect infestation or a condensation pool, for example.

Figure 9:
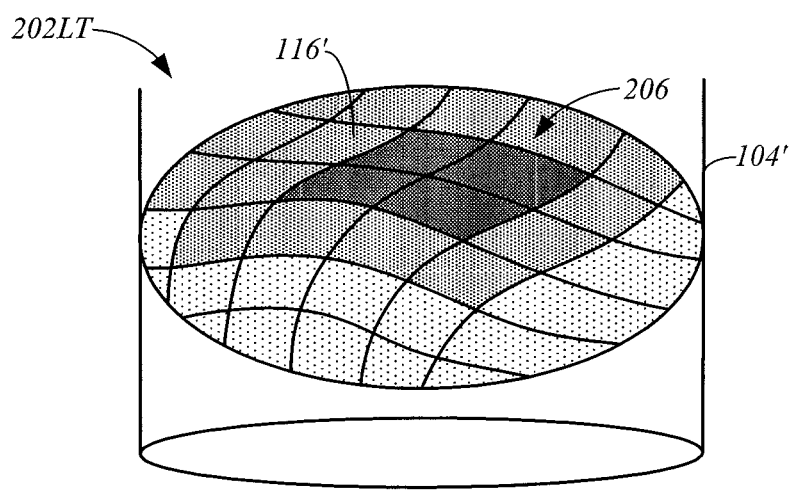
FIG. 9 is an exemplary 3D graphical representation of level and temperature measurements in accordance with embodiments of the present disclosure.

In some embodiments, the computing device 126 is configured to overlay the 2D graphical representation 202T of the temperature measurements 124 on the 3D graphical representation 202L of the level measurements 122 to form a combined 3D graphical representation of the level and temperature measurements. One exemplary combined 3D graphical representation 202LT is shown in FIG. 9, which generally combines the 2D graphical representation 202T of the temperature measurements 124 provided in FIG. 8 on the 3D graphical representation 202L of the level measurements 122 provided in FIG. 7. Such a graphical representation of the combination of the level measurements 122 and the temperature measurements 124 can quickly convey useful information to a user that can be used to improve control over conditions that may be detrimental to the process material 106 being stored in the vessel 104.

Thus, in some embodiments, the process control system 100 can display 3D graphical representation 202LT that illustrates both level and temperature measurements 122 and 124 across the virtual process material surface 116' within a virtual representation 104' of the process vessel 104. The information provided by the 3D graphical representation 202LT can allow a user to reduce energy consumption by the environmental control system 110 and respond more rapidly with pinpoint control of the environment within the process vessel 104 to prevent the formation of adverse conditions for the process material 106. This can enable more effective and efficient use of environmental control systems 110 and the material handling components 108. More effective use of the environmental control system 110 can also reduce cost through less down time and maintenance of the system.

In some embodiments, the gauge 102 and/or the computing device 126 is configured to perform diagnostics based on the temperature measurements 124. For example, the diagnostic may compare the measured temperatures on the surface 116 of the process material 106 to one or more threshold temperatures to determine whether adverse conditions exist in the process vessel 104. For example, the temperature measurements 124 may be analyzed to determine whether a cold or hot spot, such as that indicated by spot 206 (FIGS. 8 and 9), exists on the process material surface 116, which may indicate adverse conditions for the process material 106, such as an area of condensation, an area of infestation, or other adverse condition. In some embodiments, the computing device 126 is configured to generate an alert based on the temperature measurements 124, such as when one or more of the measured temperatures on the surface 116 exceed or fall below one or more threshold values indicating adverse conditions for the process material 106. In some embodiments, the alert may be produced on the display 200. Alternatively, an alert may be generated using an output device 208, which may provide an audible or visible alert. Additional alerts include a message notification that may be sent to a mobile device and other alerts.

Figure 10:
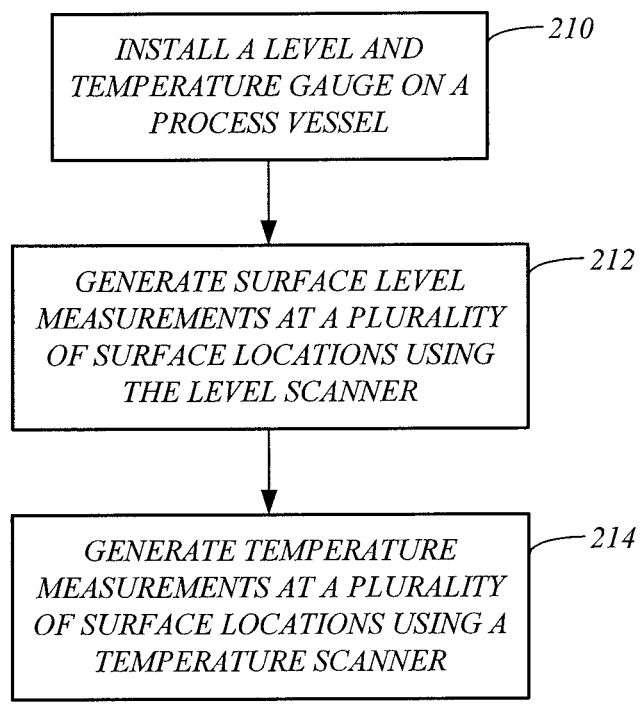
FIG. 10 is a flowchart illustrating an exemplary method in accordance with embodiments of the present disclosure.

Additional embodiments of the present disclosure are directed to methods of using the level and temperature gauge 102 in a process control system 100. FIG. 10 is a flowchart illustrating an exemplary method in accordance with embodiments of the present disclosure. At 210 of the method, a level and surface temperature gauge 102 is installed on a process vessel 104 containing a processing material 106, such as illustrated in FIGS. 1 and 3. The gauge 102 may be formed in accordance with embodiments described herein. In one embodiment, the gauge 102 includes a housing structure 140 attached to the process vessel 104, a level scanner 112 supported by the housing structure 140, and a temperature scanner 114 supported by the housing structure 140.

At 212 of the method, surface level measurements 122 of a surface 116 of the process material 106 are generated at a plurality of locations on the surface 116 using the level scanner 112. In some embodiments, the level scanner 112 includes a phase-array level gauge system that includes a plurality of acoustic antennas 142 and level measurement circuitry 144. In one embodiment, the level measurements 122 are generated in step 212 by transmitting acoustic signals 148A toward the surface 116 using each of the acoustic antennas 142, and receiving echo signals 148B corresponding to reflections of the transmitted acoustic signals 148A from the surface 116 using the acoustic antennas 142. The level measurements 122 are then generated based on the received echo signals 144B using, for example, the level measurement circuitry 144 (FIG. 2), in accordance with conventional techniques.

At 214 of the method, temperature measurements 124 of the surface 116 are generated at a plurality of locations on the surface 116 using the temperature scanner 114. In some embodiments of step 214, the temperature scanner includes a thermal graphic imaging device 160 that includes optics 162, an array of infrared detectors 164, and temperature measurement circuitry 166, as shown in FIG. 2. One embodiment of the method at step 214 includes receiving infrared light 168 at each of the infrared detectors 164 through the optics 162, and generating infrared level signals 170 using the infrared detectors 164 based on the received infrared light 168. The temperature measurements 124 are then generated in step 214 using, for example, the temperature measurement circuitry 166 (FIG. 2), based on the infrared signals 170.

In some embodiments of the method, the level measurements 122 and the temperature measurements 124 are communicated to a computing device 126 using, for example, communications circuitry 128 (FIG. 2). In some embodiments, each of the temperature measurements includes a temperature 124A and a location 124B on the material surface 116 corresponding to the temperature 124A, and each of the level measurements 122 includes a level 122A and a location 124B on the material surface 116 corresponding to the level 122A. As a result, the temperature measurements 124 map the temperatures measured by the infrared detectors 164 over the material surface 116, and the level measurements 122 map the levels measured by the acoustic antennas 142 over the process material surface 116.

In some embodiments of the method, one or more graphical representations 202 of the level measurements 122 and the temperature measurements 124 are displayed on a display 200 of the computing device 126. Examples of such graphical representations 202 include the 3D graphical representation 202L of the level measurements 122 shown in FIG. 7, the 2D graphical representation 202T of the temperature measurements 124 shown in FIG. 8, and the 3D graphical representation 202LT of the combined level and temperature measurements shown in FIG. 9. In some embodiments, the 3D graphical representation 202LT includes a mapping of the temperature measurements 124 on the 3D representation 116' of the material surface 116.

In some embodiments, the thermal graphic imaging device 160 includes a surround 180 extending from the housing structure 140, such as a base 182 of the housing structure 140. As discussed above, the optics 162 may be supported at a proximal end 186 of the surround 180, and are configured to receive the infrared light 168 through an opening at a distal end 184 of the surround 180. In some embodiments of the method, dust is purged from the surround 180 using a dust purging device 190. This purging of the surround 180 may include vibrating the surround 180 using a vibrator 192, and/or blowing air against an interior 198 of the surround 180 using a nozzle 106 of the dust purging device 190, as generally shown in FIG. 6.

Although the embodiments of the present disclosure have been described with reference to preferred embodiments, workers skilled in the art will recognize that changes may be made in form and detail without departing from the spirit and scope of the present disclosure.

What is claimed is:

1. A level and surface temperature gauge comprising:
a housing structure;
a level scanner supported by the housing structure and configured to generate surface level measurements of a plurality of locations on the surface of a process material surface formed of solids; and
a temperature scanner supported by the housing structure and configured to generate temperature measurements of the process material surface at a plurality of locations on the surface,
wherein the temperature scanner includes a thermographic imaging device comprising:
optics;
an array of infrared detectors each configured to generate an infrared level signal based on infrared light received by the infrared detector through the optics; and
temperature measurement circuitry configured to generate the temperature measurements based on the infrared level signals.

2. The gauge of claim 1, wherein; the level scanner includes a phased-array level gauge system comprising:
a plurality of acoustic antennas, each configured to transmit acoustic signals toward the process material surface and receive echo signals corresponding to reflections of the acoustic signals from the process material surface; and
level measurement circuitry configured to generate the level measurements based on the received echo signals.

3. The gauge of claim 2, further comprising a controller configured to communicate the level measurements and the temperature measurements to a computing device using communications circuitry.

4. The gauge of claim 3, wherein:
each of the temperature measurements includes a temperature and a location on the material surface corresponding to the temperature; and
each of the level measurements includes a level and a location on the material surface corresponding to the level.

5. The gauge of claim 1, further comprising a surround extending from the housing structure, wherein the optics of the thermographic imaging device are supported at a proximal end of the surround and are configured to receive the infrared light through an opening at a distal end of the surround.

6. The gauge of claim 5, wherein the surround is conically shaped and tapers toward the proximal end.

7. The gauge of claim 5, further comprising a dust purging device configured to purge dust from the surround.

8. The gauge of claim 7, wherein the dust purging device includes a vibrator attached to the surround.

9. The gauge of claim 8, wherein the thermographic imaging device is isolated from vibrations generated by the vibrator.

10. The gauge of claim 7, wherein the dust purging device includes an air purging system including a nozzle configured to direct a flow of air into an interior of the surround.

11. A method comprising:
  installing a level and surface temperature gauge on a process vessel containing a process material formed of solids, the gauge comprising:
  a housing structure attached the process vessel;
  a level scanner supported by the housing structure; and
  a temperature scanner supported by the housing structure;
  generating surface level measurements of a surface of the process material at a plurality of locations on the surface using the level scanner; and
  generating temperature measurements of the surface at a plurality of locations on the surface using the temperature scanner,
  wherein:
  the temperature scanner includes a thermographic imaging device comprising:
  optics;
  an array of infrared detectors; and
  temperature measurement circuitry; and
  generating temperature measurements comprises:
  receiving infrared light at each of the infrared detectors through the optics;
  generating infrared level signals using the infrared detectors based on the received infrared light; and
  generating the temperature measurements based on the infrared signals.

12. The method of claim 11, wherein:
  the level scanner includes a phased-array level gauge system comprising:
  a plurality of acoustic antennas; and
  level measurement circuitry; and
  generating surface level measurements comprises:
    transmitting acoustic signals toward the surface using each of the acoustic antennas;
    receiving echo signals corresponding to reflections of the transmitted acoustic signals from the surface using the acoustic antennas; and
    generating the level measurements based on the received echo signals.

13. The method of claim 11, further comprising communicating the level measurements and the temperature measurements to a computing device.

14. The method of claim 13, wherein:
  each of the temperature measurements includes a temperature and a location on the material surface corresponding to the temperature; and
  each of the level measurements includes a level and a location on the material surface corresponding to the level.

15. The method of claim 14, further comprising displaying graphical representations of the level measurements and the temperature measurements on a display of the computing device.

16. The method of claim 15, wherein the graphical representation of the level measurements includes a 3D representation of the surface of the process material, and the graphical representation of the temperature measurements includes a mapping of the temperature measurements on the 3D representation of the surface.

17. The method of claim 11, further comprising generating an alert based on the temperature measurements.

18. The method of claim 11, wherein:
  the thermographic imaging device comprises a surround extending from the housing structure, wherein the optics are supported at a proximal end of the surround and are configured to receive the infrared light through an opening at a distal end of the surround; and
  the method comprises purging dust from the surround using a dust purging device including one of vibrating the surround using a vibrator of the dust purging device, and blowing air against an interior of the surround using a nozzle of the dust purging device.

19. A process vessel for storing process material formed of solids, the process vessel comprising:
  a vessel housing having an interior cavity for containing the process material; and
  a level and surface temperature gauge comprising:
  a housing structure supported by the vessel housing;
  a level scanner supported by the housing structure and configured to generate surface level measurements of a process material surface at a plurality of locations on the surface; and
  a temperature scanner supported by the housing structure and configured to generate temperature measurements of the process material surface at a plurality of locations on the surface.

20. The process vessel of claim 19, wherein the temperature scanner includes a thermographic imaging device comprising:
  optics;
  an array of infrared detectors each configured to generate an infrared level signal based on infrared light received by the infrared detector through the optics; and
  temperature measurement circuitry configured to generate the temperature measurements based on the infrared level signals.

21. The process vessel of claim 20, further comprising:
  a surround extending from the housing structure within the interior of the vessel housing, wherein the optics of the thermographic imaging device are supported at a proximal end of the surround and are configured to receive the infrared light through an opening at a distal end of the surround; and
  a dust purging device configured to purge dust from the surround.

* * * * *